United States Patent
Kuroda (12) United States Patent (10) Patent No.: US 10,259,054 B2
(45) Date of Patent: Apr. 16, 2019

(54) END MILL (71) Applicant: KYOCERA Corporation, Kyoto-shi, Kyoto (JP)

(72) Inventor: Masahiko Kuroda, Higashiomi (JP)

(73) Assignee: KYOCERA CORPORATION, Kyoto (JP)

(*) Notice: Subject to any disclaimer, the term of this patent is extended or adjusted under 35 U.S.C. 154(b) by 92 days.

(21) Appl. No.: 15/520,472

(22) PCT Filed: Oct. 21, 2015

(86) PCT No.: PCT/JP2015/079653
§ 371 (c)(1),
(2) Date: Apr. 20, 2017

(87) PCT Pub. No.: WO2016/063894
PCT Pub. Date: Apr. 28, 2016

(65) Prior Publication Data
US 2017/0312836 A1  Nov. 2, 2017

(30) Foreign Application Priority Data
Oct. 24, 2014  (JP) .................. 2014-217417

(51) Int. Cl.
*B23C 5/10* (2006.01)
*B23C 5/00* (2006.01)

(52) U.S. Cl.
CPC ............ *B23C 5/10* (2013.01); *B23C 5/006* (2013.01); *B23C 2210/0492* (2013.01);
(Continued)

(58) Field of Classification Search
CPC ........ B23C 2210/0485; B23C 2210/40; B23C 2210/0492; B23C 2210/241; B23C 2210/483; B23C 5/10
See application file for complete search history.

(56) References Cited

U.S. PATENT DOCUMENTS 4,212,568 A * 7/1980 Minicozzi ................. B23C 5/10
407/53
4,560,308 A * 12/1985 Deller ....................... B23C 5/10
407/53

(Continued)

FOREIGN PATENT DOCUMENTS

JP    10-118826 A    5/1998
JP    2000288828 A * 10/2000 ............... B23C 5/10

(Continued)

*Primary Examiner* — Sara Addisu
(74) *Attorney, Agent, or Firm* — Volpe and Koenig, P.C.

(57) ABSTRACT

An end mill includes end cutting edges located at a front end side of a cutting edge portion of a body including rotation axis, peripheral cutting edges, and helically extending flutes. Each of the peripheral cutting edges and the flutes are alternately located from the front end side to a rear end side, and a first distance between a deepest position of the flute and the rotation axis is equal among the respective flutes in a cross section taken along the rotation axis. The flute includes a first region located at a side of the peripheral cutting edge and includes the deepest position, a second region located at a side of a heel, and a boundary. A second distance from the rotation axis to the boundary located at the rear end side is larger than the second distance located at the front end side.

13 Claims, 5 Drawing Sheets

(52) U.S. Cl.
CPC .. *B23C 2210/241* (2013.01); *B23C 2210/402* (2013.01); *B23C 2210/405* (2013.01); *B23C 2210/483* (2013.01); *B23C 2230/04* (2013.01)

(56) References Cited

U.S. PATENT DOCUMENTS

| | | | | |
|---|---|---|---|---|
| 4,740,121 | A * | 4/1988 | Arnold | B23D 77/003 408/224 |
| 5,049,009 | A * | 9/1991 | Beck | B23C 5/10 407/34 |
| 5,094,573 | A * | 3/1992 | Hougen | B23B 51/0406 407/53 |
| 7,588,396 | B2 * | 9/2009 | Flynn | B23C 5/10 407/34 |
| 2002/0031409 | A1 * | 3/2002 | Sato | B23C 5/10 407/53 |
| 2004/0258489 | A1 * | 12/2004 | Volokh | B23C 5/10 407/53 |
| 2006/0045637 | A1 * | 3/2006 | Flynn | B23C 5/10 407/53 |
| 2006/0045638 | A1 * | 3/2006 | Flynn | B23C 5/10 407/53 |
| 2006/0067797 | A1 * | 3/2006 | Calamia | B23C 5/10 407/53 |
| 2009/0317198 | A1 * | 12/2009 | Hanks | B23C 5/10 407/54 |
| 2011/0085862 | A1 * | 4/2011 | Shaffer | B23C 5/10 407/54 |
| 2015/0117974 | A1 * | 4/2015 | Pomikacsek | B23C 3/005 409/131 |
| 2016/0089728 | A1 * | 3/2016 | Archambault | B23C 5/10 407/54 |
| 2018/0250757 | A1 * | 9/2018 | Kuroda | B23C 5/10 |

FOREIGN PATENT DOCUMENTS

| | | | | |
|---|---|---|---|---|
| JP | 2005-028561 A | | 2/2005 | |
| JP | 2008055594 A | * | 3/2008 | ............ B23C 5/003 |
| JP | 2008-110453 A | | 5/2008 | |

* cited by examiner

END MILL

TECHNICAL FIELD

The present invention relates to an end mill.

BACKGROUND ART

An end mill has been used for slot milling, shoulder milling or the like of a workpiece. In such milling, it is necessary to smoothly discharge chips generated by cutting. To this end, a plurality of chip discharging flutes is formed such that each chip discharge flute is formed between two peripheral cutting edges, thus enhancing chip discharging property. However, with a larger chip discharging flute, a minimum thickness (core thickness) of an end mill body becomes smaller so that rigidity of the end mill body is lowered. Accordingly, there has been a case where the end mill is broken at a proximal end portion of the end mill which is near rear ends of the chip discharging flutes of the end mill.

On the other hand, Patent Document 1 discloses an end mill where chip discharging flutes are made small on a rear portion of an end mill body so as to increase a cross-sectional area of the end mill body. With such a configuration, rigidity of the end mill can be enhanced so that the end mill can suppress deflection thereof whereby the end mill can perform cutting with high accuracy.

Such an end mill has been requested to possess higher breaking resistance and more improved chip discharging property.

RELATED ART DOCUMENT

Patent Document

Patent Document 1: JP 10-118826 A

SUMMARY OF THE INVENTION

Means for Solving the Problems

An end mill according to the present invention includes: an end mill body including a rotation axis; a cutting edge portion located at a front end side of the end mill body; a proximal end portion located at a rear to the cutting edge portion; a shank portion located at a rear to the proximal end portion; two or more end cutting edges located at the front end side of the cutting edge portion; peripheral cutting edges located at a rear to the end cutting edges of the cutting edge portion and extending to the proximal end portion; and chip discharging flutes each located between two peripheral cutting edges and helically extending from the front end side to the proximal end portion. Each of a plurality of the peripheral cutting edges and each of a plurality of the chip discharging flutes are alternately located from the front end side to a side of the proximal end portion, and a distance between a deepest position of the chip discharging flute and the rotation axis is set equal among the respective chip discharging flutes in a cross section taken along the rotation axis of the end mill body. The chip discharging flute includes a first region located at a side of the peripheral cutting edge and including the deepest position, a second region located at a side of a heel opposite to the peripheral cutting edge, and a boundary located between the first region and the second region. A distance from the rotation axis to the boundary located at a most proximal end portion side is larger than a distance from the rotation axis to the boundary located at a most front end side.

EMBODIMENTS FOR CARRYING OUT THE INVENTION

Figure 1:
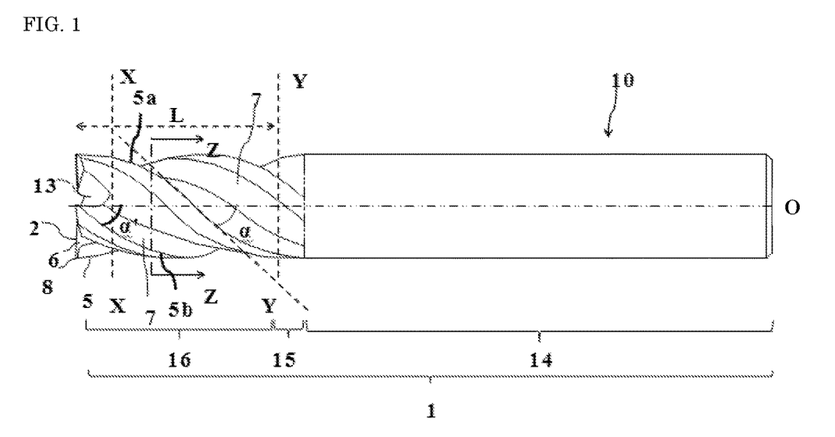
FIG. 1 is a side view of an end mill according to an embodiment of the present invention.

In FIG. 1 to FIG. 5, an end mill 10 is a solid-type end mill and has an end mill body 1. At least a portion of the end mill body 1 which includes cutting edges 9 is made of a hard material such as a cemented carbide, cermet or cBN. The end mill body 1 has an approximately circular columnar shape of a diameter D about a rotation axis O of the end mill 10. As shown in FIG. 1 and FIG. 2A, the end mill body 1 includes a shank portion 14, a proximal end portion 15 and a cutting edge portion 16 in a direction from a rear end to a front end of the end mill body 1.

As shown in FIG. 1, the end mill 10 includes so-called peripheral cutting edges 5 within a cutting edge length L from a front end of the cutting edge portion 16. The peripheral cutting edges 5 are twisted at a helix angle α with respect to a rotation axis O and are helically located at an outer periphery of the end mill body 1.

Figure 2B:
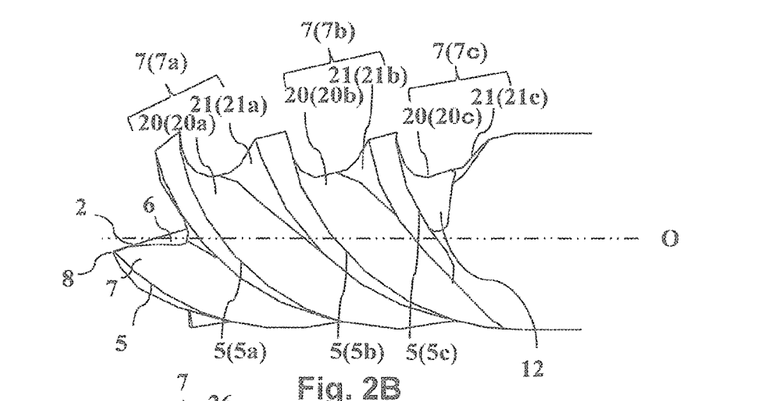
FIG. 2B is an enlarged view of a cutting edge portion shown in FIG. 2A.
Figure 3:
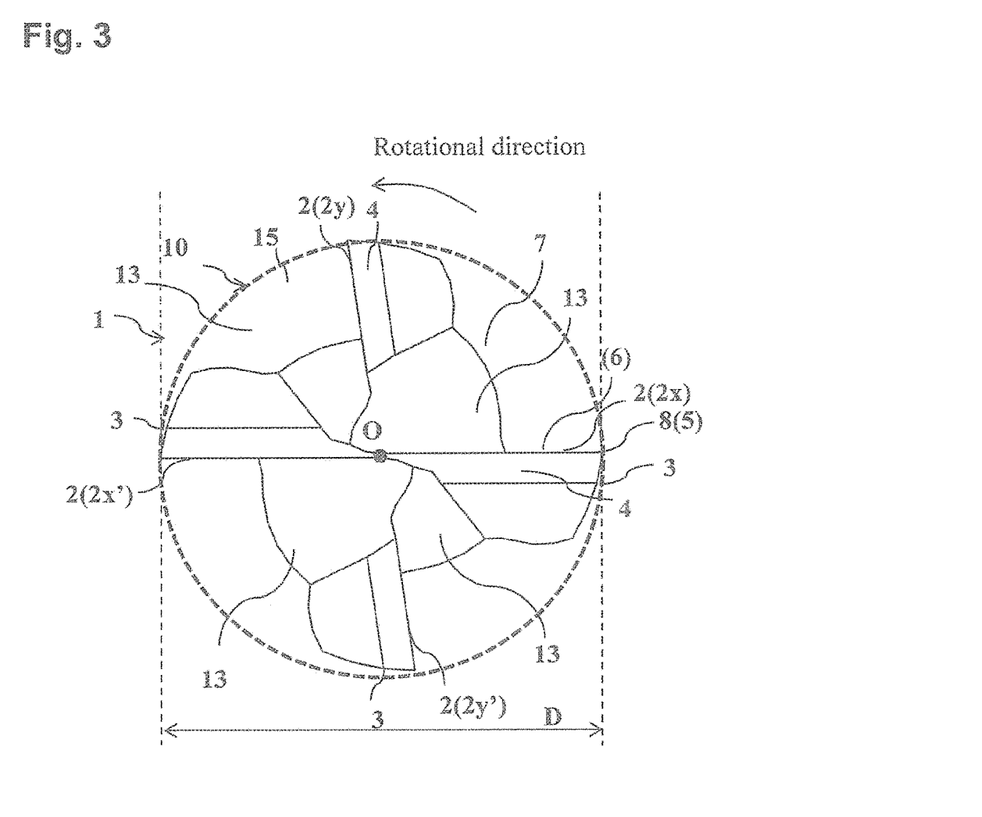
FIG. 3 is a front view of the end mill shown in FIG. 1 as viewed from a front end of the end mill.

With reference to FIG. 3 which is a front view of the end mill 10, the end mill 10 includes the end mill body 1 including the rotation axis O and two or more (four in FIG. 3) end cutting edges 2 located at the front end of the end mill body 1. The peripheral cutting edge 5 extends rearward from the end cutting edge 2, and is located in a cutting edge length L. As shown in FIG. 1 and FIG. 2B, the peripheral cutting edge 5 and the end cutting edge 2 are smoothly connected to each other at corner 8 which is outer peripheral end of the end cutting edge 2, and function as the cutting edge 9.

Figure 2A:
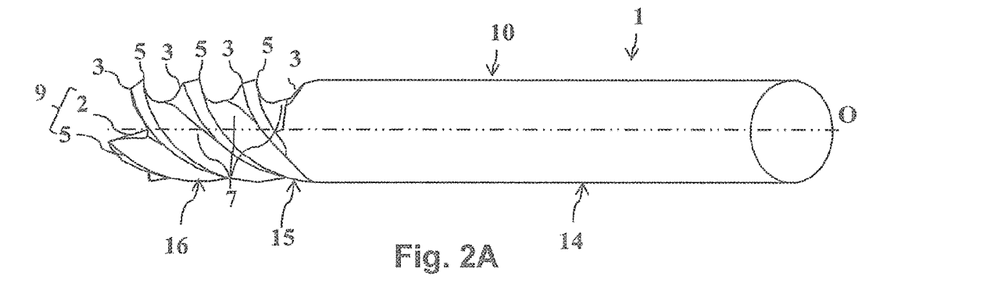
FIG. 2A is a perspective view of the end mill according to the embodiment as viewed from a rear oblique direction.
Figure 5:
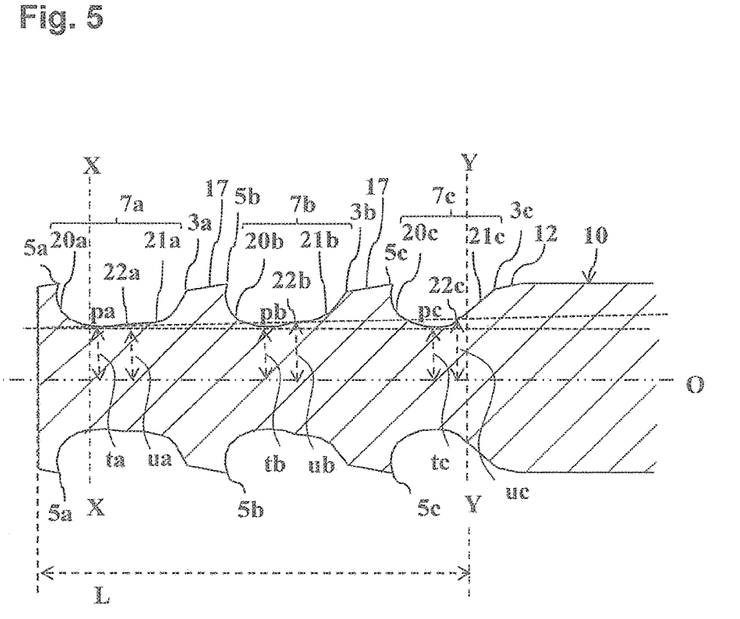
FIG. 5 is a cross-sectional view taken along a rotation axis O of the end mill shown in FIG. 2.

As shown in FIG. 1, FIG. 2A and FIG. 5, a plurality of chip discharging flutes 7 are located at the end mill body such that each chip discharging flute 7 is located between two peripheral cutting edges 5. The chip discharging flute 7 helically extends from a front end side to a side of the proximal end portion 15. As shown in FIG. 2B, turning up portion 12 having a smaller depth than flute bottom of the chip discharging flute 7 is located at the proximal end portion 15 as extensions of the chip discharging flute 7 of the cutting edge portion 16.

As shown in FIG. 5 which shows a cross section of the end mill body 1 taken along the rotation axis O, the plurality of peripheral cutting edges 5 and the plurality of chip discharging flutes 7 are located at the end mill 10 such that the peripheral cutting edge 5 and the chip discharging flute 7 are alternately located toward the side of the proximal end portion 15 from the front end side. The plurality of peripheral cutting edges 5 and the plurality of chip discharging flutes 7 which appear on the cross section taken along the rotation axis O of the end mill body 1 shown in FIG. 5 include not only the peripheral cutting edges 5 and the chip discharging flutes 7 in a plurality of leads but also the repetition of the peripheral cutting edges 5 and the chip discharging flutes 7 of the same number of leads which appear on the front end side and a rear end side.

Gashes 13 are located at the front end of the end mill body 1 such that each gash 13 is located between the chip discharging flute 7 and the end cutting edge 2, and planer rake surfaces 6 are located due to the formation of the gashes 13. Although the rake surface 6 and the peripheral cutting edge 5 do not appear in FIG. 3, the positions of the rake surface 6 and the peripheral cutting edge 5 are indicated with a parenthesis. The end cutting edge 2 is formed of side line which intersects with both the rake surface 6 and a tip flank surface 4. In FIG. 1, FIG. 2A, FIG. 2B and FIG. 5, the rotation axis O is indicated by a broken line.

Figure 4:
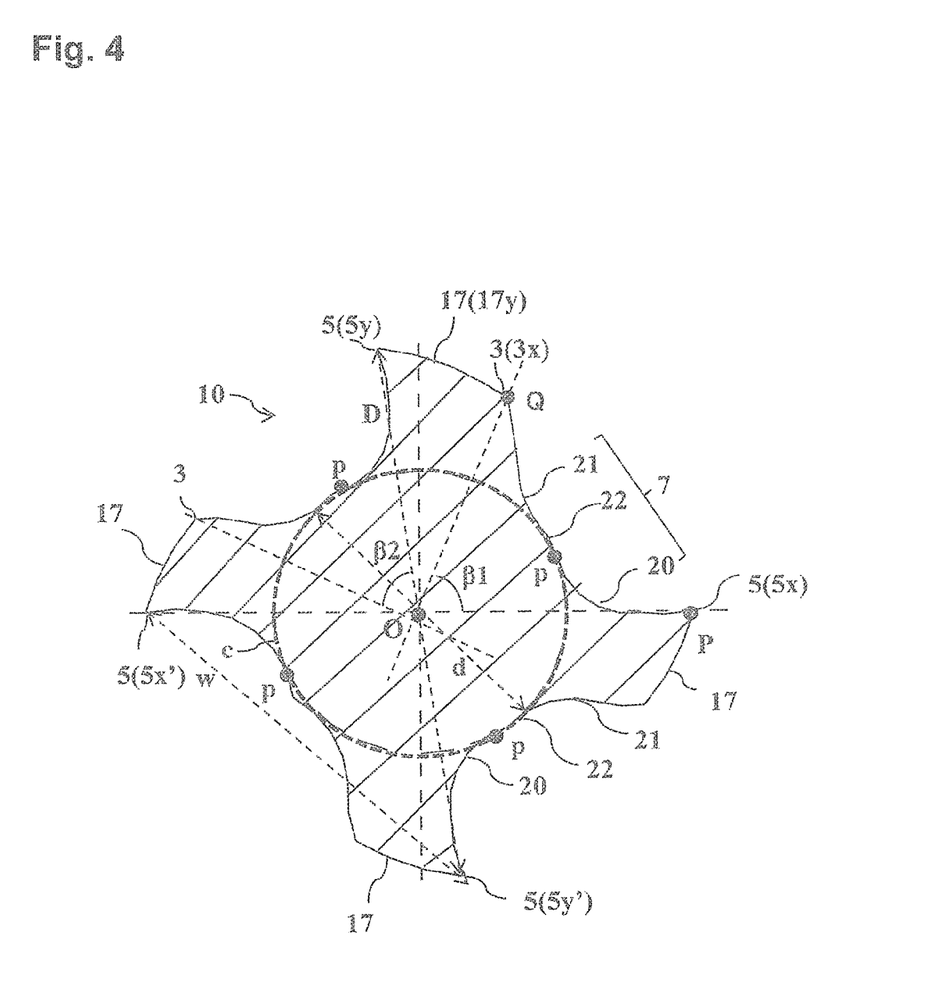
FIG. 4 is a cross-sectional view of the end mill shown in FIG. 1 taken along a line Z-Z.

In the end mill 10, as shown in FIG. 3 and FIG. 4, the chip discharging flutes 7 are positioned respectively in the rotational direction of the end mill 10 from the respective end cutting edges 2. In the chip discharging flute 7, a heel 3 is located at a position opposite to the peripheral cutting edge 5 (an outermost point of the end cutting edge 2). The tip flank surface 4 is located in a reverse rotational direction of the end cutting edge 2. In this embodiment, a terminal end of the flank surface which oppositely faces the peripheral cutting edge 5 with the chip discharging flute 7 of the end mill body 1 interposed therebetween is defined as the heel 3. As shown in FIG. 4 which shows a cross section taken along a line Z-Z, in a cross section perpendicular to the rotation axis O, the heel 3 (3x) is an intersecting point between a side flank surface (17y) of the peripheral cutting edge 5 (5y) located adjacently to the oppositely-facing peripheral cutting edge 5 (5x) in the rotational direction and the chip discharging flute 7.

In this embodiment, as shown in FIG. 5, a distance t (ta to tc) between a deepest position p (pa to pc) of the chip discharging flute 7 (7a to 7c) and the rotation axis O is set equal among the respective chip discharging flutes 7 (7a to 7c). That is, a core thickness d in a transverse cross section perpendicular to the rotation axis O in FIG. 4 is equal among the respective chip discharging flutes 7 (7a to 7c) in the cross section taken along the rotation axis O in FIG. 5. Chips are guided to rear ends of the chip discharging flutes 7 while being strongly brought into contact with flute bottoms of the chip discharging flutes 7 and being bent by the flute bottoms. Hence, even when a lot of chips is produced, the chips can be guided to the rear ends of the chip discharging flutes 7 whereby the end mill 10 can acquire favorable chip discharging property. In this embodiment, "distance t (ta to tc) is equal" means that the difference in distance t ((ta to tc)/t) falls within 5%.

In this embodiment, in a cross section orthogonal to the rotation axis O at the position where the end mill 10 includes the chip discharging flutes 7 shown in FIG. 4, the core thickness d is 0.5 to 0.8 times as large as a diameter D of the end mill 10 expressed as a ratio of the core thickness d to the diameter D of the end mill 10 (d/D). As far as the core thickness d falls within this range, the end mill 10 has a high strength so that breaking of the end mill 10 can be suppressed. In FIG. 4, the core thickness d is defined as a diameter of a largest circle C depicted at a center portion of the end mill 10, and is set equal to a value twice as large as a distance between the rotation axis O and the deepest position P of the chip discharging flute 7.

In manufacturing steps, the chip discharging flutes 7 are formed by applying working to the end mill body 1 at least two times. The chip discharging flute 7 includes a first region 20 on a side of the peripheral cutting edge 5, a second region 21 on a side of a heel 3, and a boundary 22 located between the first region 20 and the second region 21. The first region 20 includes the deepest position p of the chip discharging flute 7.

In this embodiment, at the time of applying working to the first region 20, the first region 20 is worked with the same flute depth from the front end to the rear end of the cutting edge portion 16. Then, at the time of applying working to the second region 21, the second region 21 is worked such that a flute depth is gradually decreased toward the rear end from the front end of the cutting edge portion 16, thus forming the first region 20, the second region 21, and the boundary 22 located between the first region 20 and the second region 21.

The first region 20 and the second region 21 differ from each other in their state of working traces (direction or shape) and, hence, the first region 20 and the second region 21 can be distinguished from each other. Although the boundary 22 located between the first region 20 and the second region 21 may be formed so as to smoothly connect the first region 20 and the second region 21 to each other as shown in FIG. 2 to FIG. 4, the boundary 22 may be formed in a projecting manner.

Figure 2C:
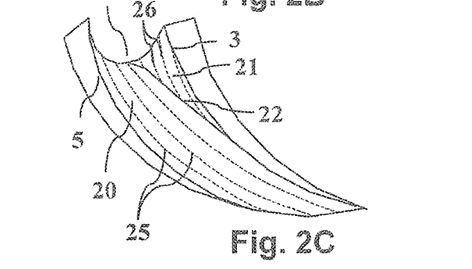
FIG. 2C is an enlarged view of a chip discharging flute shown in FIG. 2B.

In this embodiment, as shown in FIG. 2B and FIG. 2C, in the first region 20, first traces 25 are located in the same direction as an advancing direction of the chip discharging flute 7. On the other hand, in the second region 21, second traces 26 are located in a direction which intersects with a rearward advancing direction of the chip discharging flute at an acute angle. In FIG. 2C, the first traces 25 and the second traces 26 are indicated by a broken line. With such a configuration, chips can be easily guided to a rear end of the chip discharging flute 7 so that it is possible to suppress flying out of chips from the chip discharging flute 7 whereby chip discharging property can be enhanced. In the manufacturing steps of the end mill 10, a portion of the end mill 10 having such a configuration is formed such that, for example, at the time of applying working to the first region 20, the first region 20 is worked by moving a grinding wheel in a direction parallel to a helix angle $\alpha$ and, at the time of applying working to the second region 21, the second region 21 is worked by moving the grinding wheel in a direction inclined more toward a tool axis side than the helix angle $\alpha$.

In this embodiment, with respect to the chip discharging flute 7, a distance uc from the rotation axis O to the boundary 22c of the chip discharging flute 7c located at a most proximal end portion 15 side is larger than a distance ua from the rotation axis O to the boundary 22a of the chip discharging flute 7a located at a most front end side. With such a configuration, a wall thickness of the end mill body 1 at the proximal end portion 15 of the end mill 10 can be increased and hence, breaking of the end mill 10 at the proximal end portion 15 can be suppressed. Even when a volume of the chip discharging flute 7 is small or a depth of the boundary 22c which is not a flute bottom is small on the side of the proximal end portion 15 of the chip discharging flute 7, chips are already deformed and hence, there is no possibility that the chips are strongly brought into contact with the boundary 22c. Accordingly, the chips do not adversely affect chip discharging property. In this embodiment, "distance uc is larger than the distance ua" means that a ratio of uc/ua is larger than 1.05.

In this embodiment, as shown in FIG. 5, the distances ua, ub, uc from the rotation axis O to the boundary 22 of the chip discharging flute 7 are gradually increased toward the side of the proximal end portion 15 from the front end side (ua<ub<uc). With such a configuration, the end mill 10 can acquire smoother chip discharging property and, at the same time, breaking of the end mill 10 can be also suppressed.

In this embodiment, a ratio (Sg1/Sb1) between an area Sb1 of the end mill body 1 and an area Sg1 of the chip discharging flutes 7 in a cross section on the front end side of the cutting edge portion 16 is larger than a ratio (Sg2/Sb2) between an area Sb2 of the end mill body 3 and an area Sg2 of the chip discharging flutes 7 in a cross section on the rear end side of the cutting edge portion 16. With such a configuration, the end mill body 1 can acquire high breaking resistance and favorable chip discharging property. In this embodiment, the cross section on the front end side of the cutting edge portion 16 is determined as across section at a front end position of the cutting edge portion 16 except for a region where the gash 13 is formed (X-X in FIG. 1 and FIG. 5), that is, at a turning up position of the gash 13. On the other hand, the cross section on the rear end side of the cutting edge portion 16 is determined as a cross section at a rear end position of the end mill body 1 in front of the turning up portion 12 located at a proximal end of the cutting edge portion 16 (Y-Y in FIG. 1 and FIG. 5).

When the ratio (Sg1/Sb1) is 0.6 to 1.2, and the ratio (Sg2/Sb2) is 0.3 to 0.6, both breaking resistance of the end mill body 1 and chip discharging property can be enhanced in a well-balanced manner.

According to this embodiment, the gash 13 is located at the rake surface 6 and, hence, none of the first region 20, the second region 21 and the boundary 22 are located. Accordingly, an uneven surface which is followed by the first region 20, the second region 21 and the boundary 22 is not formed on the end cutting edge 2. As a result, there is no possibility that the cutting resistance at the end cutting edge 2 with a large amount of chips is increased, it is possible to suppress roughening of a worked surface, clogging of chips and chipping of the end cutting edge 2.

Although an opening angle β of the chip discharging flute 7 shown in FIG. 4 differs corresponding to the number of the cutting edges 9, a preferable range of the opening angle β is 30° to 165°. When the opening angle β falls within this range, there is no possibility that the chip discharging flute 7 becomes clogged by chips, and there is also no possibility that chips are curled by the chip discharging flute 7 and fly out from the chip discharging flute 7. The opening angle β of the chip discharging flute 7 is defined as an angle made by a straight line (indicated by a broken line) which connects a peripheral edge of the chip discharging flute 7 at the end cutting edge 2 (the position of the front end of the peripheral cutting edge 5) and the rotation axis O and a straight line (indicated by a broke line) which connects the heel 3 and the rotation axis O in FIG. 4.

In this embodiment, a helix angle α of the peripheral cutting edge 5 is 30° to 45°. When the helix angle α falls within this range, a cutting resistance component in a direction orthogonal to the rotation axis O is decreased thus giving rise to an advantageous effect that a load applied to the end mill 10 can be lowered. An interval (distance) w between the peripheral cutting edges 5 located adjacently to each other as viewed from the front end side is 0.25 to 0.75 times with respect to a diameter D of the end mill 10. According to this embodiment, even when the chip discharging flute 7 has such a narrow width, the chip discharging flute 7 exhibits favorable chip discharging property.

In this embodiment, at least one of the plurality of cutting edges 9 is unevenly distributed circumferentially such that one cutting edge 9 is not formed in a point symmetry with other cutting edges 9. That is, at least one cutting edge 9 has an asymmetrical shape with respect to other cutting edges 9. Accordingly, it is possible to suppress the generation of chattering caused by resonance of the end mill 10 at the time of cutting. As an example for forming at least one cutting edge 9 into an asymmetrical shape, a method in which an opening angle β of some end cutting edges 2 and an opening angle β of the peripheral cutting edges 5 which follow some end cutting edges 2 are changed (uneven distribution), a method in which a helix angle α is changed (uneven lead) or the like are named. In FIG. 3, among the end cutting edges 2 (2x, 2y, 2x', 2y'), the end cutting edges 2x, 2x' have an opening angle which differs from an opening angle of the end cutting edges 2y, 2y' and, as shown in FIG. 4, an opening angle β1 of the peripheral cutting edges 5 (5x, 5x') differs from an opening angle β2 of the peripheral cutting edges 5 (5y, 5y').

For example, when a helix angle α of a first peripheral cutting edge 5a among two or more peripheral cutting edges 5 differs from a helix angle α' of a second peripheral cutting edge 5b, chip discharging property in the respective chip discharging flutes 7 at a side of the end cutting edge 2 can be improved.

In the end mill 10 according to the embodiment, the cutting edge can be regenerated by repolishing the cutting edge. To be more specific, the end cutting edge 2 and the peripheral cutting edge 5 can be regenerated by repolishing the chip discharging flute 7 and repolishing the gash 13 of the rake surface 6.

DESCRIPTION OF THE REFERENCE NUMERAL

1: End mill body
2: End cutting edge
3: Heel
4: Tip flank surface
5: Peripheral cutting edge
6: Rake surface
7 (7a to 7c): Chip discharging flute
8: Corner
9: Cutting edge
10: End mill
11: Flute bottom
12: Turning up portion
13: Gash
14: Shank portion
15: Proximal end portion
16: Cutting edge portion
17: Side flank surface
20 (20a to 20c): First region
21 (21a to 21c): Second region
22 (22a to 22c): Boundary
25: First trace
26: Second trace
O: Rotation axis
D: Diameter of end mill
α: Helix angle
β: Opening angle
c: Largest circle depicted at center portion of end mill in cross section orthogonal to rotation axis at position including chip discharging flute
d: Core thickness

The invention claimed is:
1. An end mill comprising:
a body including a rotation axis and comprising;

a cutting edge portion located at a front end side of the body;
a shank portion located at a rear end side of the body;
two or more end cutting edges located at the front end side of the cutting edge portion;
peripheral cutting edges extending from the end cutting edges toward the shank portion; and
helically extending flutes, each flute located along the peripheral cutting edges, wherein
each of the peripheral cutting edges and each of the flutes are alternately located from the front end side to a rear end side of the cutting edge portion,
a distance between a deepest position of the flute and the rotation axis is set equal among the respective flutes in a cross section taken along the rotation axis,
the flute comprises
a first region being in connection with the peripheral cutting edge and including the deepest position,
a second region located away from the peripheral cutting edge, and
a boundary having a convex shape and located between the first region and the second region; and
a distance from the rotation axis to the boundary located at the rear end side of the cutting edge portion is larger than a distance from the rotation axis to the boundary located at the front end side of the cutting edge portion.

2. The end mill according to claim 1, wherein a distance from the rotation axis to the boundary is gradually increased toward the rear end side from the front end side of the cutting edge portion.

3. The end mill according to claim 1, wherein in the first region, a first trace is located in the same direction as an advancing direction of the flute, and in the second region, a second trace is located in a direction which intersects with a rearward advancing direction of the flute at an acute angle.

4. The end mill according to claim 1, wherein the peripheral cutting edges comprise a first peripheral cutting edge and a second peripheral cutting edge having a helix angle differs from a helix angle of the first peripheral cutting edge.

5. The end mill according to claim 1, wherein the boundary is away from the end cutting edges.

6. The end mill according to claim 5, further comprising rake surfaces located between the flutes and the end cutting edges.

7. The end mill according to claim 6, wherein each of the rake surfaces is plane.

8. An end mill comprising:
a body including a rotation axis and comprising;
a cutting edge portion located at a front end side of the body;
a shank portion located at a rear end side of the body;
two or more end cutting edges located at the front end side of the cutting edge portion;
peripheral cutting edges extending from the end cutting edges toward the shank portion; and
helically extending flutes, each flute located along the peripheral cutting edges, wherein
each of the peripheral cutting edges and each of the flutes are alternately located from the front end side to a rear end side of the cutting edge portion,
a distance between a deepest position of the flute and the rotation axis is set equal among the respective flutes in a cross section taken along the rotation axis,
the flute comprises
a first region being in connection with the peripheral cutting edge and including the deepest position;
a second region located away from the peripheral cutting edge; and
a boundary located between the first region and the second region;
a distance from the rotation axis to the boundary located at the rear end side of the cutting edge portion is larger than a distance from the rotation axis to the boundary located at the front end side of the cutting edge portion,
the first region comprises first traces located in the same direction as an advancing direction of the flutes, and
the second region comprises second traces located in a direction which intersects with a rearward advancing direction of the flutes at an acute angle.

9. The end mill according to claim 8, wherein a distance from the rotation axis to the boundary is gradually increased toward the rear end side from the front end side of the cutting edge portion.

10. The end mill according to claim 8, wherein the peripheral cutting edges comprise a first peripheral cutting edge and a second peripheral cutting edge having a helix angle differs from a helix angle of the first peripheral cutting edge.

11. The end mill according to claim 8, wherein the boundary is away from the end cutting edges.

12. The end mill according to claim 11, further comprising rake surfaces located between the flutes and the end cutting edges.

13. The end mill according to claim 12, wherein each of the rake surfaces is plane.

\* \* \* \* \*